(12) United States Patent
Urbanke et al.

(10) Patent No.: US 6,175,944 B1
(45) Date of Patent: Jan. 16, 2001

(54) METHODS AND APPARATUS FOR PACKETIZING DATA FOR TRANSMISSION THROUGH AN ERASURE BROADCAST CHANNEL

(75) Inventors: Rudiger L. Urbanke, New York, NY (US); Aaron Daniel Wyner, South Orange, NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 08/892,855

(22) Filed: Jul. 15, 1997

(51) Int. Cl.[7] ................................................. H03M 13/00
(52) U.S. Cl. ........................................... 714/776; 714/752
(58) Field of Search ................................... 371/30, 37.01; 370/473, 913, 912; 382/240, 232, 239; 375/39; 709/207; 714/776, 752

(56) References Cited

U.S. PATENT DOCUMENTS

| | | | |
|---|---|---|---|
| 5,233,629 | * 8/1993 | Paik et al. | 375/39 |
| 5,577,134 | * 11/1996 | Westerink | 382/240 |
| 5,586,200 | * 12/1996 | Devaney et al. | 382/232 |
| 5,617,541 | * 4/1997 | Albanese et al. | 709/207 |
| 5,671,156 | * 9/1997 | Weerackody et al. | 364/514 R |
| 5,691,992 | * 11/1997 | Molnar et al. | 371/37.1 |
| 5,757,821 | * 5/1998 | Jamal et al. | 371/30 |
| 5,781,561 | * 7/1998 | Machida et al. | 371/37.01 |
| 5,828,788 | * 10/1998 | Chiang et al. | 382/239 |

OTHER PUBLICATIONS

Christopoulos et al., "A Hybrid Method For Image Partitioning In Low Bit Rate Segmented Image Coding", Jun. 1997 IEEE, pp. 845–848.*

Park et al., "Efficient Hierarchcal Segmentation Based on PSNR for Low Bit Rate Coding", Jun. 1996 IEEE, pp. 157–160.*

A. Albanese, J. Blomer, J. Edmonds, M. Luby and M. Sudan, "Priority Encoding Transmission", IEEE Transactions on Information Theory, vol. 42, No. 6, pp. 1737–1745, 1996.

S.G. Mallat, "Multifrequency Channel Decompositions of Images and Wavelet Models", I.E.E.E. Transactions on Acoustics, Speech and Signal Processing, vol. 37, No. 12, pp. 2091–2210, 1998.

P.J. Burt and E.H. Adelson, "Laplacian Pyramid as a Compact Image Code", I.E.E.E. Transactions on Communication, vol. 33, No. 4, pp. 532–540, 1983.

Richard E. Blahut, "Theory and Practice of Error Control Codes", Ch. 7, pp. 161–191, 1983.

* cited by examiner

*Primary Examiner*—Albert De Cady
*Assistant Examiner*—David Ton
(74) *Attorney, Agent, or Firm*—Law Offices of Peter H. Priest, PLLC

(57) ABSTRACT

A system for transmitting data over an erasure channel. A data block is divided into coarse and fine segments. The coarse segment is encoded using an error-correcting encoding process. The fine segment and the encoded coarse segment are combined and divided into packets, and the packets are transmitted over the erasure channel. When the data is received, the coarse segment is decoded. If data packets were lost during transmission, the coarse segment is reconstructed as the received data block. If no packets were lost, the fine segment is combined with the coarse segment and the entire data block as originally transmitted is reconstructed. For large numbers of packets, the system invention can achieve any point within the capacity region of an erasure channel.

20 Claims, 4 Drawing Sheets

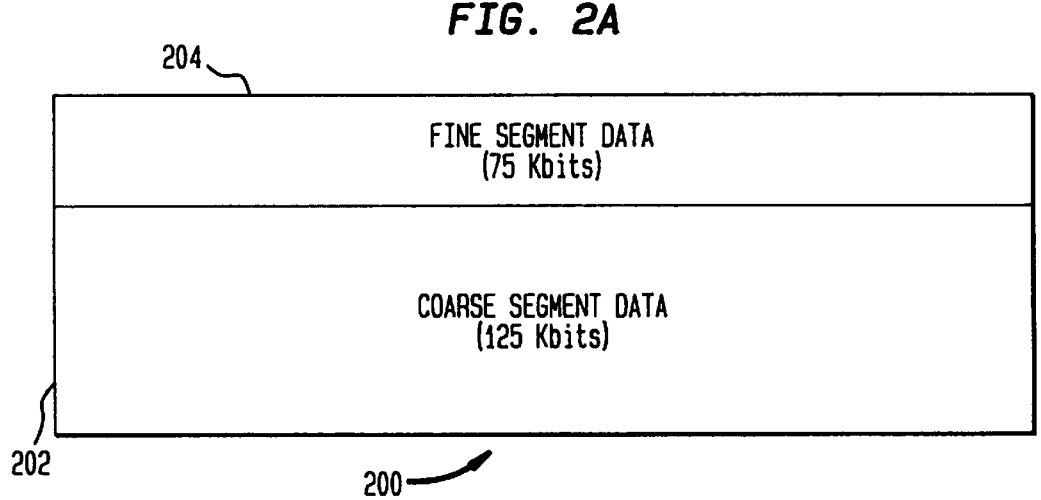
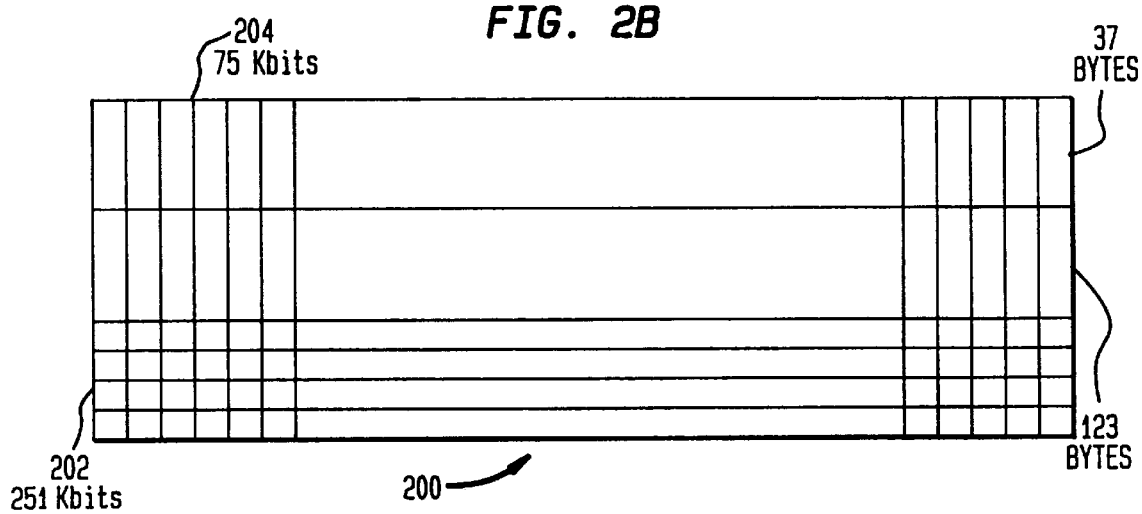

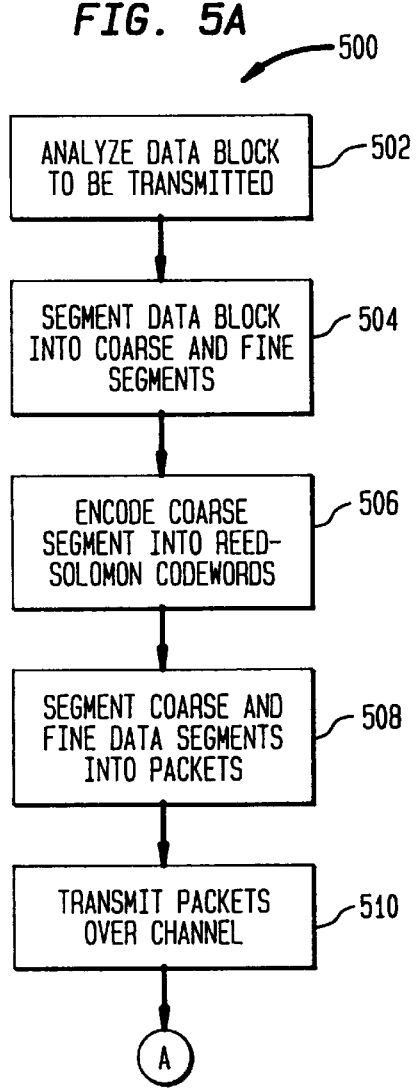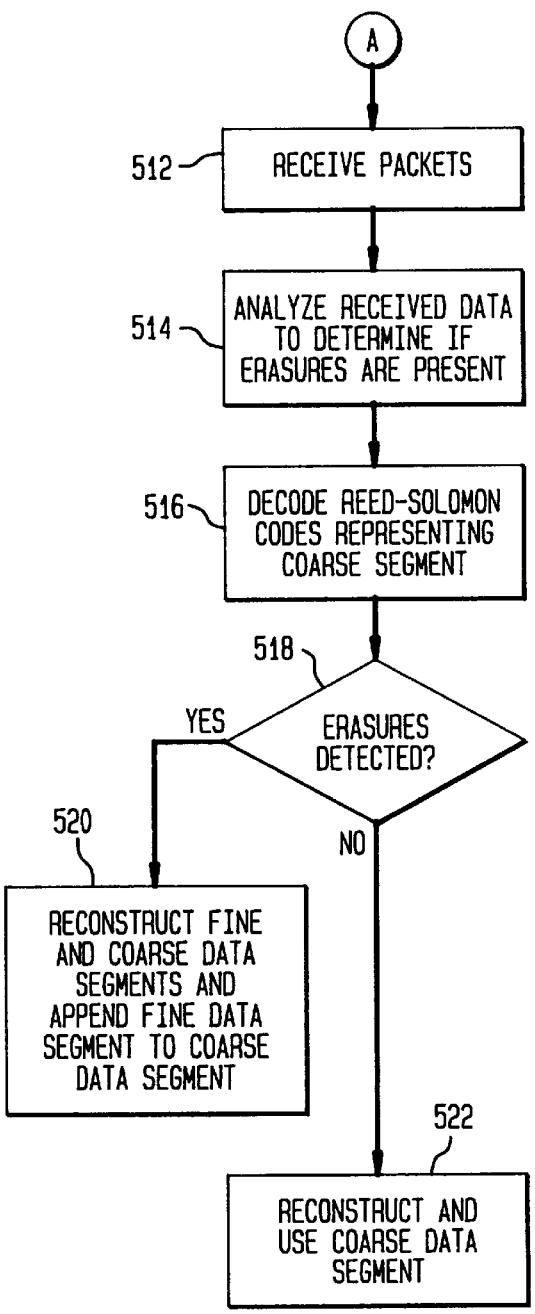

METHODS AND APPARATUS FOR PACKETIZING DATA FOR TRANSMISSION THROUGH AN ERASURE BROADCAST CHANNEL

FIELD OF THE INVENTION

The present invention relates generally to data transmission over a channel which is subject to losses. More particularly, the invention relates to methods and apparatus for transmitting a data set which will be transmitted with a first higher level of transmission quality if a first level of losses occur and with a second lower level of quality having an acceptable level of degradation if a second higher level of losses occur, without the necessity for retransmitting lost data.

BACKGROUND OF THE INVENTION

Digital data transfer has been an important technology for many years. Traditionally, digitally transferred data has been packaged as files. When a file is transferred, the loss of data is often critical, because the data contained in the file defines not only the information of the file, which can often be reconstructed, but the structure of the file, which informs the reading device where the file begins and ends, and which data is to be viewed as part of the file. Moreover, digital data transfers have traditionally been accomplished by a server connected more or less directly to a client through a telephone line or similar device. While such a connection is susceptible to losses, the losses are usually not excessive.

Traditional digital data transfer, because of the need to transfer a file with its complete data and structure, and because of the relatively low losses introduced by traditional transfer methods, has typically been intolerant of losses. Typically, data transfers were monitored for losses, and any lost data was retransmitted. The need to retransmit data naturally increased the time required for a data transfer, but the additional time required was usually not great, and the added time was required because the data needed to be transmitted without errors.

More recently, data transfers have increasingly taken place over networks lacking a dedicated connection between server and client, with the leading such network being the Internet. Data is transmitted over the Internet through routings which may differ from the transmission of one packet to the next. This contributes significantly to the likelihood that data will be lost. Moreover, a substantial portion of the data transmitted over the Internet consists of graphics and sounds. An acceptable transmission of such items may be highly tolerant of losses, but less tolerant of delay.

Many Internet users would be only too glad to sacrifice a certain amount of picture quality in order to have a picture display faster. Even more importantly, real-time voice communication is increasing in importance as an Internet application. If data losses occur during a real-time voice communication, the degradation in quality caused by these losses may be imperceptible, while the time lost in retransmitting lost packets in order to reconstruct the data without error would adversely cause an interruption in the conversation. Thus, while in such an environment, a loss-free transmission is ideal and preferable so that no packets would be lost, in a real world transmission in which packets are lost, an imperfect transmission of the data would be highly preferable to the delays which would be occasioned by the retransmission of the lost packets.

There exists, therefore, a need in the art for a way to transmit data by means of digital packets such that a reduced quality reconstruction of the data is possible if a certain number of packets are lost, with a finer reconstruction being achieved with the loss of fewer packets.

SUMMARY OF THE INVENTION

The present invention preferably employs Reed-Solomon codes to transfer data; however, it will be recognized that other codes may be suitably employed. Each block of data is divided into two or more portions. With two portions, by way of example, one portion is being represented by Reed-Solomon codewords and defines basic coarse data to be transmitted even in the event of data losses, and the other portion is represented by additional data bytes appended to the codewords and defining additional fine detail to be transmitted when no data losses occur. If each codeword is of length n, dimension k and distance d=n−k+1, the code corrects any pattern of d-1 erasures.

Each block of data to be transmitted is divided into n packets, where n is the length of the codeword. Each packet contains i bytes, where i is the number of codewords used to convey the coarse information of the data block. Each packet contains an additional k bytes, where k is the number of additional fine bytes required to fully describe the data block.

In another aspect, a set of codewords representing a data block to be transmitted may be broadcast over a plurality of channels. Each channel may have a different erasure probability. Thus, varying numbers of packets will arrive successfully at the receiver depending on which of the various channels is traversed. The coarse or fine version of the data block will be decoded at each receiver, depending on whether or not all packets successfully arrive. At least the coarse version of the data block will be able to be decoded, so long as at least d packets arrive successfully. Other aspects of the invention provide the ability to decode the data block with varying levels of refinement in the case where more than d but less than all of the packets arrive successfully. It will be recognized that multiple levels of basic data may be transmitted employing codes designed to correct for varying levels of erasure.

A more complete understanding of the present invention, as well as further features and advantages of the invention, will be apparent from the following Detailed Description and the accompanying drawings.

BRIEF DESCRIPTION OF THE DRAWINGS

FIG. 2A shows a data block encoded according to the teachings of the present invention;

FIG. 2B shows a data block encoded and organized into packets according to the teachings of the present invention;

FIGS. 5A and 5B are flowcharts illustrating methods of encoding and transmitting data, and receiving and decoding data, respectively, according to the present invention.

DETAILED DESCRIPTION

Figure 1:
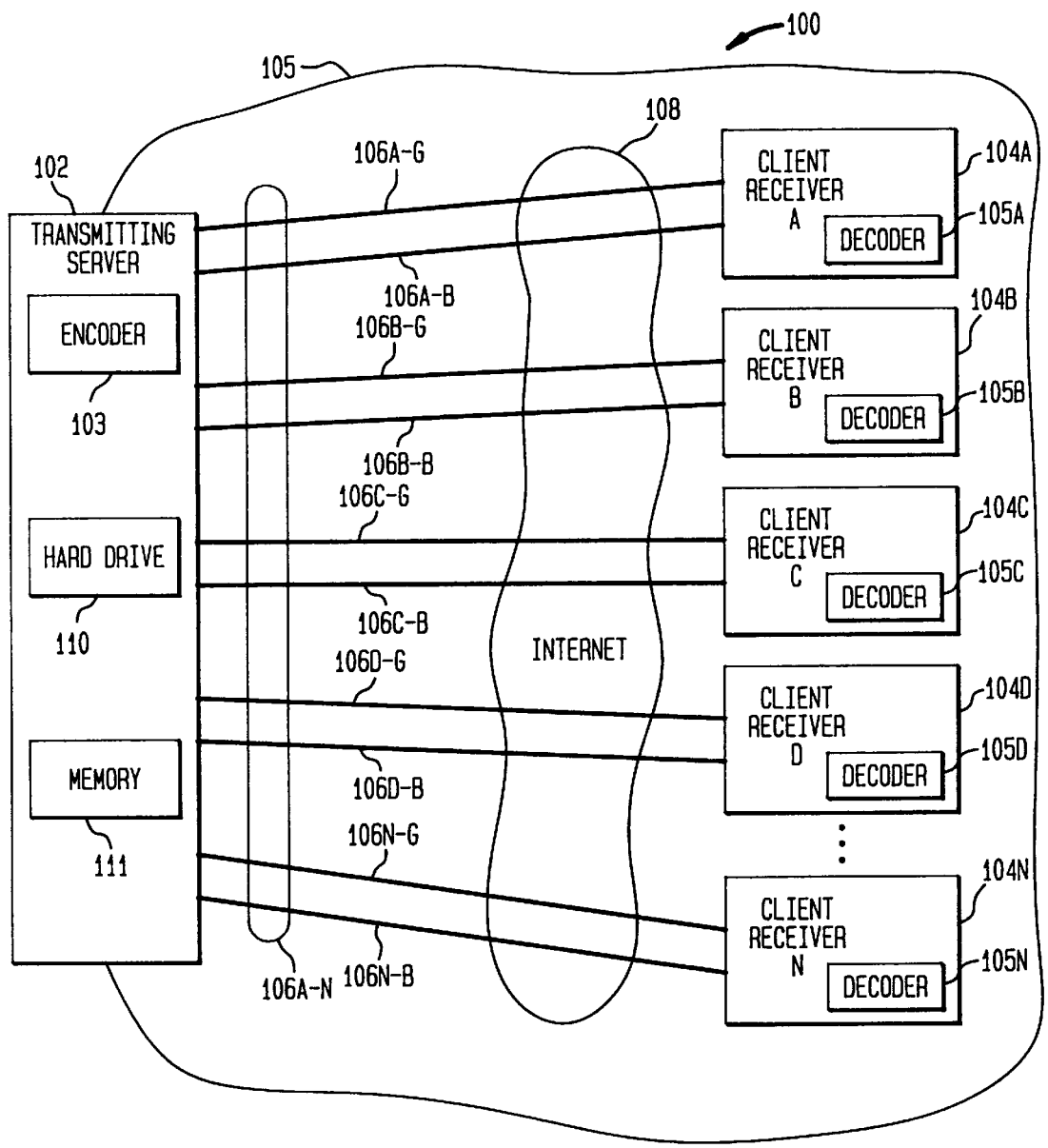
FIG. 1 illustrates a diagram modelling an N-channel broadcast network employing encoding and decoding techniques according to the teachings of the present invention.

FIG. 1 illustrates an N-channel broadcast network 100 employing the principles of the present invention. Network 100 includes a transmitting server 102 and a plurality of client receivers 104A-N. While one server 102 and the plurality of client receivers 104A-N are shown by way of example, any number of servers and clients may be accommodated by the network 100. Server 102 communicates with client receivers 104A-N through an erasure channel 105. The erasure channel 105 consists of a plurality of erasure channels 106A-N. Each of the channels 106A-N may be modeled by a combination of two erasure channels, a "good" channel—for example, channel 106A-G; and a "bad" channel, for example, channel 106A-B. A good channel such as the channel 106A-G passes the data through to its client receiver intact, while a bad channel such as channel 106A-B loses some of the data, returning empty packets, or erasures whenever a packet is lost. While the present example assumes two channels, one of which has no erasures and one which has a certain level, it will be understood that both channels may have some level of erasures, and that multiple erasure probabilities 0, $k_1, k_2, k_3 \ldots k_n$ may be addressed with the cost being that adding additional levels adds redundancy and results in longer packets. The exemplary embodiment shown provides the teachings necessary to address any desired number of levels of coarse and fine data using the desired number of bits and codes other than Reed Solomon codes.

In the example shown, the channels 106A-N pass through the Internet 108. Channels 106A-N may suitably share a common trunk (not shown) from the server 102 to the Internet 108, but branch into channels 106A-N, respectively, in connecting between the Internet 108 and various client receivers 104A-N, respectively. Each of the erasure channels 106A-N is susceptible to faults which, with a particular probability, the erasure probability, prevent the successful transfer of data.

Thus, a proportion of the data passing through channels 106A-N will be lost, with the amount of data loss corresponding to the erasure probability. In the illustrated example, the server 102 is shown as including an encoder 103 and client receivers 104A-C are shown as including decoders 105A-N. It will be recognized, however, that the server 102 can suitably be a computer such as a personal computer ("PC") or any other suitable computer or processor, and the clients 104A-C can also suitably be PC's or other computers, with encoding and decoding implemented directly within the server 102 and the clients 104A-C, respectively, through software, without separate encoders and decoders implemented in hardware.

FIG. 2A illustrates an exemplary data block 200 which has been encoded and organized according to the teachings of the present invention. The data block 200 represents a picture after data compression and is 200 kbits in size. The data block 200 is suitably stored on a server such as the server 102 in FIG. 1 as a data file on a hard drive 110 or other appropriate memory ill or storage medium. For transmission by a network, such as the network 100, the data block 200 is analyzed and separated into coarse segment data 202 and fine segment data 204 of 125 kbits and 75 kbits, respectively.

FIG. 2B illustrates further details of the data block 200 encoded and organized into an array of data so as to transmit the exemplary picture according to the teaching of the present invention. The segment 202 is encoded using Reed-Solomon coding. The 125 kbits of segment 202 are encoded into codewords having parameters n=255, k=128, d=n−k+1=128 over the field $GF(2^8)$, where n is the codeword length, k is the dimension of the code, and d is the distance. The code corrects any pattern of d-1, or 127 erasures. Different parameters may be chosen in order to achieve the desired trade off between the bandwidth occupied by redundant data and the desired erasure tolerance.

In the present example, 123 codewords are needed to convey the data of segment 202. Thus, segment 202 is encoded into 255 packets. Each packet, $1 \leq I \leq 255$ contains 123 bytes, which represent the ith component of each of the 123 codewords containing the coarse information of segment 202. In order to allow for reconstruction of the entirety of picture 200 when combined with coarse segment 202, fine segment 204 is organized into 255 segments of 37 bytes each. Each of the 37 bytes of fine segment 204 is added to the 123 bytes of coarse segment 202. Thus, the picture is encoded into the data block 200, which consists of 255 packets of 160 bytes each prior to transmittal. While it is presently preferred that coarse and fine data be appended together into data blocks or packets, it will be recognized that not every block will need to have either coarse or fine data.

The data block 200 may be suitably transmitted over any of the channels 106A-N shown in FIG. 1. If no packets are lost, the picture can be reconstructed in its entirety. If packets are lost in the transmittal, the redundancy introduced by Reed-Solomon coding of the segment 202 permits the segment 202 to be reconstructed. The total size of transmittal block 200 is 160×255×8, or 326,400 bits or 326.4 kbits. This size represents an increase over the raw picture size of 200 kbits of about 63 percent, but still represents a substantial savings over the space which would be required to encode the entire data block using Reed Solomon coding.

For large numbers of packets, the problem is equivalent to that of determining the capacity region of an erasure broadcast channel. It can be demonstrated that an encoding method and apparatus according to the teaching of the present invention can be used to achieve any point in the capacity of the channel.

Figure 3:
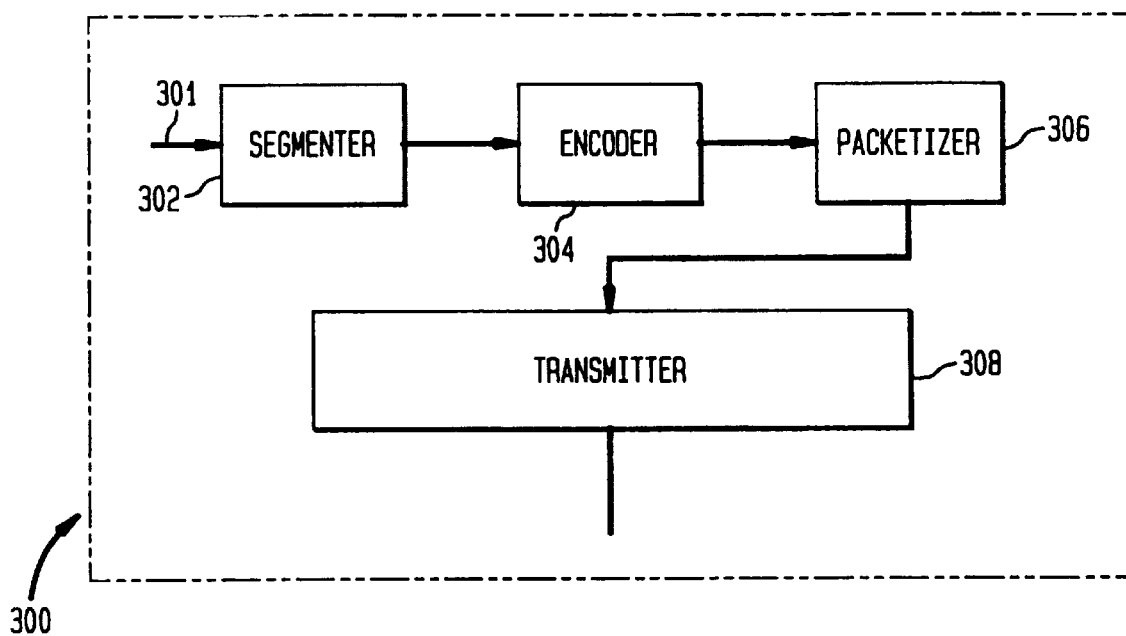
FIG. 3 illustrates a data encoding and transmitting system according to the present invention.

FIG. 3 illustrates a data preparation and transmitting unit 300 operating in accordance with the principles of the present invention, and suitable for inclusion in a transmitting server 102 as illustrated in FIG. 1. Data preparation and transmitting unit 300 includes a data input 301 to a segmenter 302, an encoder 304, a packetizer 306, and a transmitter 308. The data preparation and transmitting unit 300 preferably receives data from data storage devices in the server 102 and responds to commands from the server 102 to prepare and transmit data. When the data preparation and transmitting unit 300 receives a data block for transmission, the segmenter 302 first analyzes the data block and segments the block into coarse and fine segments. For further details of such segmentation, see, for example, S. G. Mallat, "Multifrequency Channel Decompositions of Images and Wavelet Models", I.E.E.E. Transactions on Acoustics, Speech and Signal Processing, Vol. 37, No. 12, pp. 2091–2110, 1998; and P. J. Burt and E. H. Adelson, "Laplacian Pyramid as a Compact Image Code", I.E.E.E. Transactions on Communication, Vol. 33, No. 4, pp. 532–540, 1983, which are both incorporated herein in their entirety. These coarse and fine segments are then provided to encoder 304 which encodes the coarse segment into Reed-Solomon codes. The packetizer 306 arranges the coarse and fine segments into sequences of packets as described above in connection with FIG. 2 above. Finally, the transmitter 308 transmits the packets according to a selected protocol.

Figure 4:
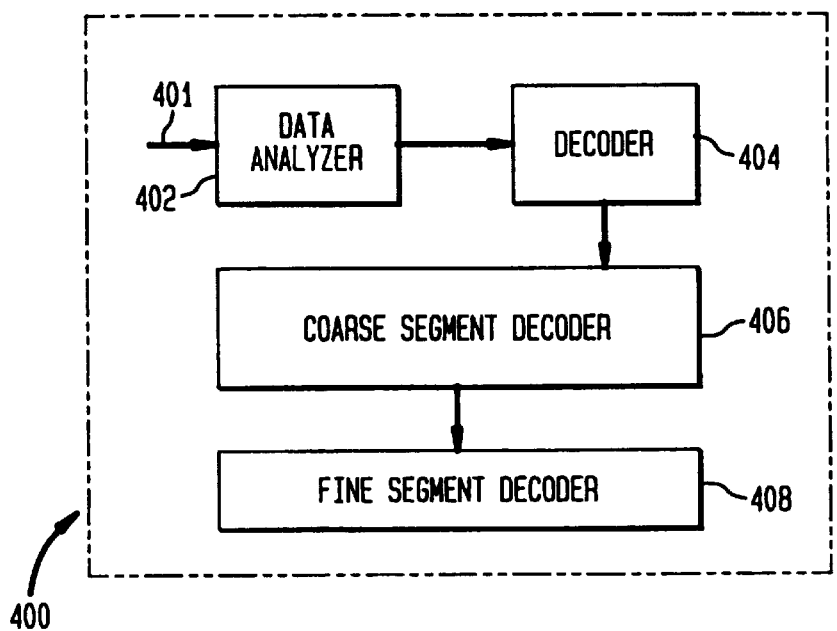
FIG. 4 illustrates a data receiving and decoding system according to the present invention.

FIG. 4 illustrates a data reception and analysis unit 400 suitably employed as part of a client receiver such as receiver 106A illustrated in FIG. 1. Data reception and analysis unit 400 receives data on a data input 401 and includes a data analyzer 402, a Reed-Solomon decoder 404, a coarse segment decoder 406, and a fine segment decoder 408. When a data block is received by the data reception and analysis unit 400 on data input 401, the data analyzer 402 examines the data block to determine if it contains erasures. If the data block contains no erasures, the data block will be able to be completely reconstructed. The Reed-Solomon decoder 404 then decodes the data constituting the coarse data segment. This decoding method is well-understood and is described in detail in, for example, Richard E. Blahut, *Theory and Practice of Error Control Codes,* Ch. 7, pp. 161–191, 1983 which is incorporated by reference herein in its entirety. The Reed-Solomon decoder 404 passes the decoded data to the coarse segment decoder 406, where the coarse data block is reconstructed. Next, the data from the fine data segment is passed to the fine segment decoder 408, which reconstructs the fine data segment from the data received and appends it to the coarse data segment. The full detail including the fine data is then provided to the user.

If data analyzer 402 finds that the received data contains erasures, the operation is similar except that the fine segment decoder no longer can decode the fine segment data. The Reed-Solomon decoder 404 simply decodes the coarse segment data and passes it to the coarse segment decoder 406, where the coarse segment data is prepared for use and a coarse output is provided to the user.

FIG. 5A is a flowchart illustrating a method 500 of encoding and transmitting a data block according to the principles of the present invention. At step 502, the data block to be transmitted is analyzed. At step 504, the data block is segmented into coarse and fine segments. At step 506, the coarse segment is encoded into Reed-Solomon codewords. At step 508, the codewords of the coarse segment and the data of the fine segment are segmented into packets, with the number of packets being the length of the codeword used, and with each packet containing a corresponding byte from each codeword, as well as a portion of the data from the fine segment divided such that the data from the fine segment is divided equally across the packets. At step 510, the packets are transmitted over a desired channel, such as, for example, an erasure broadcast channel.

In FIG. 5B, at step 512, the packets are received by a receiver. At step 514, the data packets are analyzed to determine if erasures are present. At step 516, the Reed-Solomon codes representing the coarse segment are decoded. At step 518, branching occurs depending on whether erasures were detected in the received data block. If no erasures were detected in the data block, control is transferred to step 520 and the fine data segment is reconstructed and appended to the coarse data segment. If erasures were detected, control is transferred to step 522 and the coarse data segment is reconstructed and used.

While the present invention is disclosed in the context of a presently preferred embodiment, it will be recognized that a wide variety of implementations may be employed by persons of ordinary skill in the art consistent with the above discussion and the claims which follow below. By way of example, it will be recognized that various combinations of hardware and software may be employed to implement the invention including suitable programmed general purpose computers, such as PCs, workstations, minicomputers or mainframes which are connected to and through wired, wireless or combinations of wired and wireless networks subject to erasures, such as the Internet, using modems, telephone lines or the like. Different numbers of bits and bytes may be selected as optimal based on the application at hand. Multiple levels and different codes may also suitably be employed.

We claim:

1. A method for transmitting a data block over a packet switched network, the packet switched network being susceptible to data loss, comprising the steps of:

partitioning the data block into sub-packet sized segments, the segments including coarse segments allowing a reduced quality reconstruction of the data and fine segments allowing a finer reconstruction of the data block;

encoding the coarse segments into error-correcting codewords, each codeword consisting of a number of symbols;

dividing the fine segments into sections, the number of sections being up to the number of symbols in each codeword;

appending the coarse segments and the fine segments into packets in which at least some of said packets include both a coarse segment and a fine segment; and transmitting the packets over the packet switched network.

2. The method of claim 1 further comprising the steps of:

receiving the packets at a client receiver;

decoding the codewords at the receiver to reconstruct the coarse segments; and reconstructing the fine segments from the data representing the fine segments if less than a predetermined number of packets were lost and appending the fine segments to the coarse segments to reconstruct the data block.

3. The method of claim 1 wherein the packets comprise arrays of data bits consisting of the codewords representing the coarse segments appended to the data representing the fine segments.

4. The method of claim 3, and further including the step of organizing the arrays into packets so that each packet includes a corresponding codeword symbol from each codeword and a corresponding data section from one of the fine segments.

5. The method of claim 1, wherein the coarse data segments are encoded using Reed-Solomon coding.

6. The method of claim 5, wherein said packet switched network is the Internet.

7. Apparatus for transmitting data over a channel susceptible to losses, comprising:

a data analyzer for examining a data block and segmenting the block into coarse segments allowing a reduced quality reconstruction of the data block and fine segments allowing a finer reconstruction of the data block;

an encoder for encoding the coarse segments into error-correcting codewords, the codewords consisting of a plurality of symbols;

a data organizer for dividing the fine segments into sections, each of the fine segments having up to the same number of sections as symbols in the codewords;

a data preparer for arranging the coarse segments and the fine segments into contiguous data arrays, the arrays having an equal width, the width being defined by the number of symbols in a codeword;

a packetizer for arranging the data arrays into a series of packets, each packet containing a codeword symbol for each codeword, the symbols contained in each packet having a position in each codeword corresponding to the position of the packet in the series, each packet also containing a data section from the fine segment, the data section in each packet having a position in the fine segment corresponding to the position of the packet in the series; and a transmitter for transmitting the series of packets over the channel.

8. A receiver for receiving data in packets over a channel which is subject to data loss, at least some of the packets containing a coarse segment allowing a coarse representation having a reduced quality reconstruction of the data and a fine segment allowing a finer representation having a finer quality reconstruction of the data, the coarse segment consisting of error-correcting codewords, the receiver comprising:

an analyzer to examine incoming data and determine if the received data is missing a predetermined number or more of lost elements;

a coarse segment decoder to decode the coarse segment and to reconstruct the coarse segment as the coarse representation of the received data if the received data is missing said predetermined number or more of lost elements; and a fine segment decoder to decode the fine segment and to combine the fine segment with the coarse segment as the finer representation of the received data if the received data contains less than said predetermined number of lost elements.

9. A data communications system for transmitting data which is subject to losses, comprising:

a data analyzer for examining a data block and segmenting the block into coarse segments allowing a coarse reconstruction of the data block and fine segments allowing a finer reconstruction of the data block;

an encoder for encoding the coarse segments into error-correcting codewords, the codewords consisting of a plurality of symbols;

a packetizer for appending the coarse segments and the fine segments into data arrays comprising a series of packets, each packet containing a codeword symbol for each codeword, the symbols contained in each packet having a position in each codeword corresponding to the position of the packet in the series; and a transmitter for transmitting the series of packets over a communication channel.

10. The system of claim 9 further comprising a receiver having:

an analyzer to examine incoming data and determine if received data contains lost elements;

a coarse segment decoder to decode the coarse segments and to reconstruct the coarse segments as the coarse reconstruction of the received data if the received data contains a first level of lost elements; and a fine segment decoder to decode the fine segment and to combine the fine segment with the coarse segment as the finer reconstruction of the received data if the received data contains a second level of lost elements.

11. The communications system of claim 9, wherein the encoder is operative to encode data using Reed-Solomon coding.

12. The communications system of claim 9, wherein the transmitter is operative to transmit the series of packets over a packet-switched network.

13. A method for transmitting a data block over a channel, comprising:

partitioning the data block into segments, the segments including coarse segments allowing a coarse reconstruction of the data block and fine segments allowing a finer reconstruction of the data block;

encoding the coarse segments into a number of error-correcting codewords, each codeword comprising a plurality of symbols;

dividing the fine segments into sections, the number of sections in the fine segments being the same as the number of symbols in each codeword;

arranging the coarse segments and the fine segments into arrays, each array consisting of the codewords representing a coarse segment and the data representing a fine segment, the array being capable of being transmitted over a channel and reconstructed upon receipt to duplicate the complete data block if a first level of losses occur, or to duplicate the coarse segment if a second level of losses occur; and transmitting the arrays over a communications channel.

14. The method of claim 13, further including the step of organizing the arrays into packets, each packet including a corresponding codeword symbol from each codeword and a corresponding data section from a fine segment.

15. The method of claim 13, wherein the coarse data segment is encoded using Reed-Solomon coding.

16. The method of claim 13, wherein the channel includes one or more packet-switching networks.

17. The method of claim 16, wherein one of said one or more packet-switching networks is the Internet.

18. A method for receiving and decoding a data block, comprising:

receiving an array representing the data block, the array comprising a coarse segment allowing a coarse reconstruction of the data block and a fine segment allowing a finer reconstruction of the data block, the coarse segment comprising a plurality of error-correcting codewords, each codeword comprising a plurality of symbols, the fine segment comprising a plurality of sections, the number of sections in the fine segment being the same as the number of symbols in each codeword;

reconstructing the coarse segment to produce the coarse reconstruction of the data block; and if the array was received with a first level of losses, reconstructing the fine segment and appending the fine segment to the coarse segment to produce the finer reconstruction of the data block.

19. The method of claim 18 wherein the codewords are Reed-Solomon codewords.

20. A method for transmitting a data block in packets over a packet switched network, the packet switched network being susceptible to packet loss, comprising the steps of:

partitioning the data block into a plurality of sub-packet sized segments n, the segments ranging from coarse to fine and having corresponding erasure fractions $Q_1$ through $Q_n$;

encoding each of the segments into error correcting codewords matched to said erasure fractions $Q_1$ through $Q_n$;

arranging the segments having varying erasure fractions $Q_1$ through $Q_n$ into an array, the array consisting of the codewords representing the encoded segments;

transmitting the array in packets over the channel to a client receiver; and at each receiver, decoding the codewords to reconstruct a desired segment or segments to establish a finer or coarser representation of the data block depending on the number of packets lost during transmission.

* * * * *